F. PALMITER.
CLUTCH.
APPLICATION FILED FEB. 8, 1911.

1,010,682.

Patented Dec. 5, 1911.

WITNESSES:
Floyd A. Deahl.
W. H. Mack.

FRANK PALMITER.
INVENTOR.
BY George J. Oltsch.
ATTORNEY.

UNITED STATES PATENT OFFICE.

FRANK PALMITER, OF SOUTH BEND, INDIANA, ASSIGNOR TO INDIANA ANCHOR FENCE CO., OF SOUTH BEND, INDIANA, A CORPORATION OF INDIANA.

CLUTCH.

1,010,682. Specification of Letters Patent. Patented Dec. 5, 1911.

Application filed February 8, 1911. Serial No. 607,259.

*To all whom it may concern:*

Be it known that I, FRANK PALMITER, a citizen of the United States, residing at South Bend, in the county of St. Joseph and State of Indiana, have invented certain new and useful Improvements in Clutches, of which the following is a specification.

My invention relates to friction clutches, and is more particularly designed for use in connection with the driving gear of automobiles, and the object of the invention resides in the provision of means whereby the clutch will be quick and positive in its action, as well as simple in structure and operation.

A further object of the invention resides in the provision of means whereby a quick separation of the friction members is obtained, in order to overcome the tendency of friction members to adhere for a space of time, due to various causes, after the control lever is shifting for disconnecting the clutching members.

With these and other objects in view, the invention consists in certain novel details of construction and combinations of parts hereinafter more fully pointed out in the claims.

Figure 1:
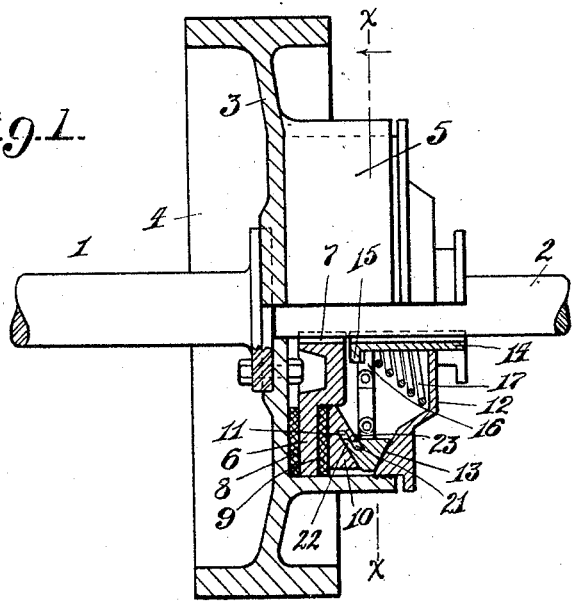
Figure 2:
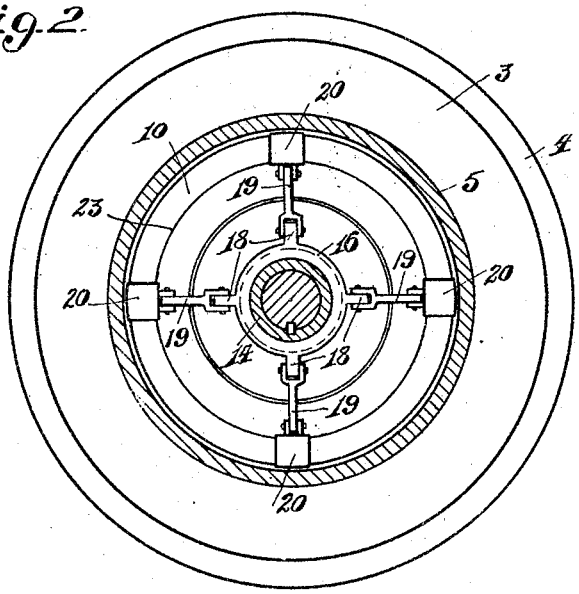

In the accompanying drawings, which show the preferred embodiment of my invention, Figure 1 is a central sectional view, partly in elevation, and Fig. 2 is a cross-sectional view taken on the line $x$—$x$ of Fig. 1.

The clutch or coupling, as is customary, controls the transmission of power between two shafts, 1 and 2, one of which is the driving and the other the driven member. The driving shaft 1 is attached to the web 3, of a fly-wheel 4, by means of bolts passing through a flange on the shaft and through the web, as shown. Located on one side of the web, and preferably formed integral therewith, is a cylindrical shell 5, which, with the web forming a closure for one end, and a cap closing the opposite end, forms an inclosed casing for the clutch members.

Mounted upon the driven shaft 2, is a metallic disk 6, which is held against relative angular movement by a spline 7, seated in a groove in the shaft and extending into a similar groove in the hub of the disk, so as to permit relative longitudinal movement thereof. A fiber or composition disk 8 is interposed between the disk 6 and the end of the casing, and a similar fiber disk 9 is interposed between the disk 6 and the flat surface of a thrust ring 10, which latter has a double cone-shaped concaved formation on its opposite surface when viewed in cross-section, with an annular groove 11 formed therein, as plainly shown in the drawing. The end of the shell 5 is closed by a cap 12, which has a threaded engagement with the shell, or which may be locked in engagement therewith in any other suitable manner. The cap 12 is provided with a cone-shaped concaved inner surface 13, complemental to the cone-shaped concaved surface of the adjoining thrust ring 10. Mounted upon the shaft 2 so as to have relatively longitudinal, but not relatively lateral movement, is a sleeve 14, provided with a flanged inner end 15, against which a ring 16 is held by an expansion spring 17. The ring 16 is provided with a plurality of lugs 18, to which one end of the links 19 are pivotally connected, the opposite ends of which have pivotal connection with the wedge-blocks 20, disposed between the cone-shaped surfaces of the thrust ring 10 and the cap 12. Each wedge-block is provided with a groove 21, of an angle corresponding with the angle of the annular groove 11 in the thrust ring, whereby the tongue 22 formed on each wedge block will have engagement with the groove 11, and the overlapping edge 23 of the thrust ring will enter the grooves 21 in the wedge-blocks, whenever the latter are drawn toward the center by actuating the sliding sleeve 14, with which an operating lever (not shown) is connected in the usual manner.

It will be readily understood from the foregoing description that, upon shifting the sleeve 14 inwardly, the wedge-blocks will cause the thrust ring to shift and bring the fabric disks, the interposed metallic disk and the end of the casing, all into binding engagement, and by their frictional adherence impart motion from one shaft to the other. By an outward movement of the sleeve 14, the wedge-blocks will be drawn toward the shaft, and in so doing the slightest movement thereof, owing to the angular tongue and groove connection between the same and the thrust ring, will positively retract the latter and thus overcome the tendency of the disks to adhere for a space of time after the lever is thrown to release the same, which is due to the rubbing and heating of the relatively rotating parts while under pressure, and the adhesion of oil and the formation of a vacuum between the disks.

Having thus described my invention, what is claimed is—

1. In a clutch, the combination with a driving and a driven member, of a thrust member, wedge members having a sliding interlocking connection with said thrust member for positively shifting the latter in either direction, and means for actuating the wedges.

2. In a clutch, the combination with a driving shaft and a driven shaft, of a thrust member, frictional engaging means therebetween, wedges having a tongue formed thereon at an angle to their direction of movement for engagement with a groove in the thrust member, whereby relatively lateral movement of the wedges will positively shift the thrust member longitudinally of the driven shaft in either direction, and means for operating the wedges.

3. In a clutch, the combination with a driving shaft and a driven shaft, of a thrust member, frictional engaging means therebetween, wedges having a tongue and groove connection with a tongue and groove on the thrust member, said tongues and grooves being disposed at an angle to the direction of movement of the wedges, a sleeve slidable on the driven shaft, and toggle connections between the wedges and said sleeve whereby a movement of the sleeve is imparted to the wedges.

In testimony whereof I affix my signature, in presence of two witnesses.

FRANK PALMITER.

Witnesses:
W. H. MACK,
FLOYD A. DEAHL.